United States Patent
Tanioka

(10) Patent No.: US 8,740,550 B2
(45) Date of Patent: Jun. 3, 2014

(54) STRUCTURE OF EXHAUST SECTION OF GAS TURBINE AND GAS TURBINE

(75) Inventor: Tadateru Tanioka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 761 days.

(21) Appl. No.: 12/666,211

(22) PCT Filed: Dec. 9, 2008

(86) PCT No.: PCT/JP2008/072327
§ 371 (c)(1),
(2), (4) Date: Dec. 22, 2009

(87) PCT Pub. No.: WO2009/087847
PCT Pub. Date: Jul. 16, 2009

(65) Prior Publication Data
US 2010/0322759 A1   Dec. 23, 2010

(30) Foreign Application Priority Data
Jan. 10, 2008 (JP) ................................. 2008-003368

(51) Int. Cl.
*F01D 25/16* (2006.01)

(52) U.S. Cl.
USPC ........................................................... 415/116

(58) Field of Classification Search
USPC .................. 415/110, 111, 112, 116, 175, 176
See application file for complete search history.

(56) References Cited

U.S. PATENT DOCUMENTS

| 2,724,621 A | * | 11/1955 | Kenney, Jr ..................... 384/519 |
| 2,744,722 A | * | 5/1956 | Orr ................................ 415/115 |
| 5,020,318 A | | 6/1991 | Vdoviak |
| 5,165,847 A | * | 11/1992 | Proctor et al. ................. 415/115 |
| 6,266,954 B1 | | 7/2001 | McCallum et al. |
| 6,578,363 B2 | | 6/2003 | Hashimoto et al. |

(Continued)

FOREIGN PATENT DOCUMENTS

| JP | 2675361 B2 | 11/1997 |
| JP | 2001-182503 A | 7/2001 |

(Continued)

OTHER PUBLICATIONS

A KR Decision to Grant, dated Aug. 27, 2012, issued in KR Application No. 2010-7000828.

(Continued)

*Primary Examiner* — Edward Look
*Assistant Examiner* — Aaron R Eastman
(74) *Attorney, Agent, or Firm* — Kanesaka Berner & Partners

(57) ABSTRACT

There is provided an exhaust section of a gas turbine and a gas turbine that can cool a strut and the periphery of a bearing without decreasing the efficiency of the gas turbine. A structure of an exhaust section of a gas turbine has: a casing in which a gas path part is formed; a bearing part that rotatably supports moving blades of a turbine section; a strut that extends inwardly from the casing and supports the bearing part; an opening formed in the casing; and a cooling flow channel that extends from the opening toward the bearing part along the strut to guide air at a lower temperature than an exhaust gas flowing in the gas path part to the gas path part and opens into the gas path part at a position downstream of a last-stage moving blade of the turbine section.

3 Claims, 5 Drawing Sheets

(56) References Cited

U.S. PATENT DOCUMENTS

| | | | |
|---|---|---|---|
| 6,872,047 B2 * | 3/2005 | Tanioka | 415/114 |
| 7,055,305 B2 * | 6/2006 | Baxter et al. | 60/39.5 |
| 7,373,773 B2 | 5/2008 | Noda | |
| 2002/0146317 A1 * | 10/2002 | Tanioka | 415/168.1 |
| 2002/0150467 A1 * | 10/2002 | Tanioka | 415/115 |
| 2005/0050898 A1 * | 3/2005 | Noda | 60/772 |
| 2006/0140754 A1 * | 6/2006 | Tanioka | 415/173.1 |

FOREIGN PATENT DOCUMENTS

| | | |
|---|---|---|
| JP | 2002-256813 A | 9/2002 |
| JP | 2003-239705 A | 8/2003 |
| JP | 2005-083199 A | 3/2005 |
| JP | 2007-192028 A | 8/2007 |

OTHER PUBLICATIONS

A JP Decision to Grant, dated Sep. 25, 2012, issued in JP Application No. 2008-003368.

ISR for PCT/JP2008/072327 dated Jan. 7, 2009.

Decision to Grant a Patent mailed Mar. 18, 2014, corresponds Japanese patent application No. 2012-193102.

* cited by examiner

STRUCTURE OF EXHAUST SECTION OF GAS TURBINE AND GAS TURBINE

RELATED APPLICATIONS

The present application is national phase of PCT/JP2008/072327 filed Dec. 9, 2008, and claims priority from Japanese Application Number 2008-003368 filed Jan. 10, 2008, the disclosures of which are hereby incorporated by reference herein in their entirety.

TECHNICAL FIELD

The present invention relates to a structure of an exhaust section of a gas turbine and to a gas turbine.

BACKGROUND ART

In general, an exhaust chamber of a gas turbine has a diffuser that efficiently recovers the pressure of the high-temperature gas exhausted from the turbine, a bearing that rotatably supports a rotor, a strut that supports the bearing to a casing or the like, and other components.

The gas turbine further has a vibration meter or other instruments disposed around the bearing to detect any vibration occurring during operation of the gas turbine.

Recent gas turbines are improved in efficiency and discharge exhaust gas at higher temperature accordingly. Thus, the strut needs to be appropriately cooled in order to ensure adequate creep strength. In addition, considering the heat resistance of the instruments, the instruments also need to be appropriately cooled.

To meet the needs, various techniques for cooling the strut and the instruments of the gas turbine during operation have been proposed (for example, see Patent Citations 1 and 2).

Patent Citation 1: the Publication of Japanese Patent No. 2675361

Patent Citation 2: Japanese Unexamined Patent Application, Publication No. 2003-239705

DISCLOSURE OF INVENTION

According to the techniques described in the Patent Citations 1 and 2, air extracted from the compressor section of the gas turbine is supplied to the strut for cooling.

However, since the air used for cooling is extracted from the compressor section, the techniques have a problem that the efficiency of the gas turbine decreases accordingly.

Furthermore, for example, if the air extracted from the compressor section flows radially inwardly to cool the strut, the extracted air having been compressed and increased in temperature by the compressor section is further increased in temperature before flowing to the periphery of the bearing. Even if the air is extracted from the low-pressure stage of the compressor section, the air already has a temperature of about 200° C. when it is extracted, and the temperature may rise to about 400° C. or higher after the air is used to cool the strut.

In general, the instruments disposed around the bearing are less resistant to high temperature and thus can be damaged by the air heated to about 400° C. or higher as described above.

The present invention has been made to solve the problem described above, and an object of the present invention is to provide an exhaust section of a gas turbine and a gas turbine that can cool a strut and lower the temperature of the periphery of a bearing without decreasing the efficiency of the gas turbine.

To attain the object described above, the present invention provides the following solutions.

According to a first aspect of the present invention, there is provided a structure of an exhaust section of a gas turbine, comprising: a casing in which a gas path part is formed; a bearing part that rotatably supports a rotor having moving blades of a turbine section; a strut that extends inwardly from the casing and supports the bearing part; an opening formed in the casing; and a cooling flow channel that extends from the opening toward the bearing part along the strut to guide air to the gas path part and opens into the gas path part at a position downstream of a last-stage moving blade of the turbine section.

According to the first aspect of the present invention, the pressure difference between the outside of the casing and the inside of the gas path part causes air outside the casing at a temperature lower than the exhaust gas flowing in the gas path part to flow into the gas path part through the opening and the cooling flow channel. The air flowing in the cooling flow channel cools strut by drawing heat therefrom when flowing along the strut.

The region downstream of the last-stage moving blade of the turbine section is one of regions in the gas path part where the pressure is minimized, and therefore, the cooling flow channel has an increased pressure difference between the opposite open ends. As a result, the amount of the air at low temperature flowing through the cooling flow channel increases compared with the case where the cooling flow channel opens at a different region.

In the first aspect of the present invention, preferably, a strut cover that extends along the strut to form a space between the strut and the strut cover is provided, and the space between the strut and the strut cover forms a part of the cooling flow channel.

With such a configuration, the cooling flow channel is formed to surround the strut, and the area of the strut in contact with the air flowing through the cooling flow channel increases. Therefore, the strut is more efficiently cooled by the air flowing through the cooling flow channel.

In addition, since the cooling flow channel is formed between the strut and the gas path part, less heat is transferred from the exhaust gas flowing in the gas path part to the strut.

In the first aspect of the present invention, preferably, an internal diffuser that extends along a rotational axis of the turbine section to form an air space surrounding the bearing part, a hollow strut that extends from the casing, supports the internal diffuser and connects the outside of the casing and the inside of the internal diffuser to each other, and a lid part for adjusting an opening area of the hollow strut on the casing are provided, and the space between the bearing part and the internal diffuser forms a part of the cooling flow channel.

With such a configuration, the periphery of the bearing can be cooled by the air flowing into the cooling flow channel through the hollow strut, which is at lower temperature than the exhaust gas flowing in the gas path part. Besides, the area of the opening can be adjusted by using the lid part to limit the flow rate of the air, so that decrease of the flow rate of the air that cools the strut is prevented.

According to a second aspect of the present invention, there is provided a gas turbine, comprising: a compressor section that compresses air; a combustor that mixes the air compressed by the compressor section and fuel to cause combustion to generate combustion gas; a turbine section that derives rotational driving force from the combustion gas; and the exhaust section according to the present invention described above into which exhaust gas discharged from the turbine section flows.

According to the second aspect of the present invention, since the gas turbine has the exhaust section according to the first aspect of the present invention, the strut, the bearing part, and instruments or the like placed around the bearing part are cooled by the air flowing through the cooling flow channel.

The structure of the gas turbine according to the first aspect of the present invention and the gas turbine according to the second aspect are advantageous in that the pressure difference between the outside of the casing and the inside of the gas path part causes air to flow from the outside of the casing along the strut to cool the strut, and therefore, the strut and the periphery of the bearing can be cooled without decreasing the efficiency of the gas turbine and without being affected by load variations.

BEST MODE FOR CARRYING OUT THE INVENTION

A gas turbine according to an embodiment of the present invention will be described with reference to FIGS. 1 to 5.

Figure 1:
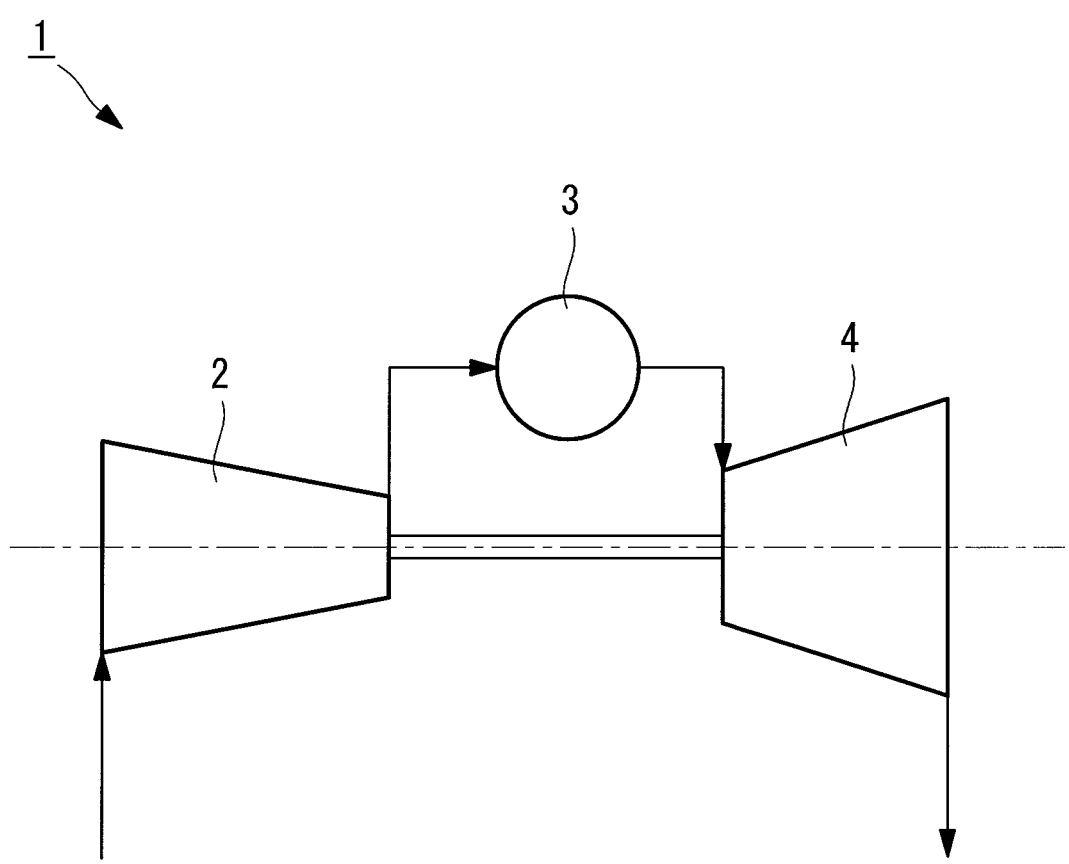
FIG. 1 is a schematic diagram illustrating a configuration of a gas turbine according to an embodiment of the present invention.

FIG. 1 is a schematic diagram illustrating a configuration of a gas turbine according to this embodiment.

As shown in FIG. 1, a gas turbine 1 according to this embodiment has a compressor section 2 that compresses air, a combustor 3 that mixes the compressed air and fuel to cause combustion to generate combustion gas, a turbine section 4 that derives rotational driving force from the combustion gas, and an exhaust section 5 that receives exhaust gas discharged from the turbine section 4.

The compressor section 2 compresses intake air and supplies the compressed air to the combustor 3.

The compressor section 2 and the turbine section 4 are installed on a rotary shaft, and the turbine section 4 rotationally drives the compressor section 2.

The combustor 3 mixes the compressed air supplied from the compressor section 2 with fuel to cause combustion of the air-fuel mixture. The resulting exhaust gas at high temperature is supplied to the turbine section 4.

The turbine section 4 derives rotational driving force from the combustion gas supplied from the combustor 3 and applies the rotational driving force to the compressor section 2 or other machinery. The exhaust gas discharged from the turbine section 4 flows into the exhaust section 5.

Figure 2:
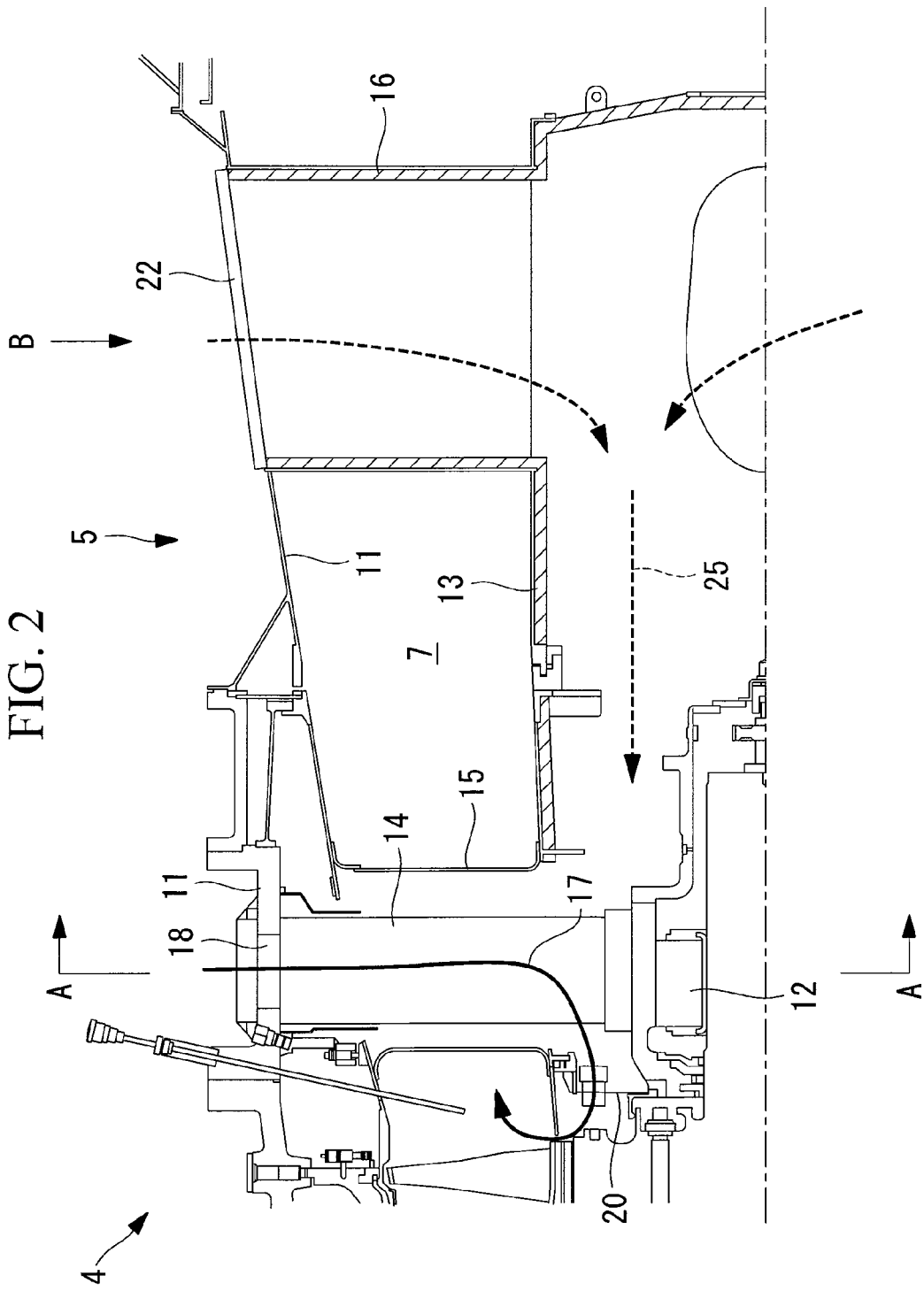
FIG. 2 is a partially enlarged view illustrating an exhaust section shown in FIG. 1.
Figure 3:
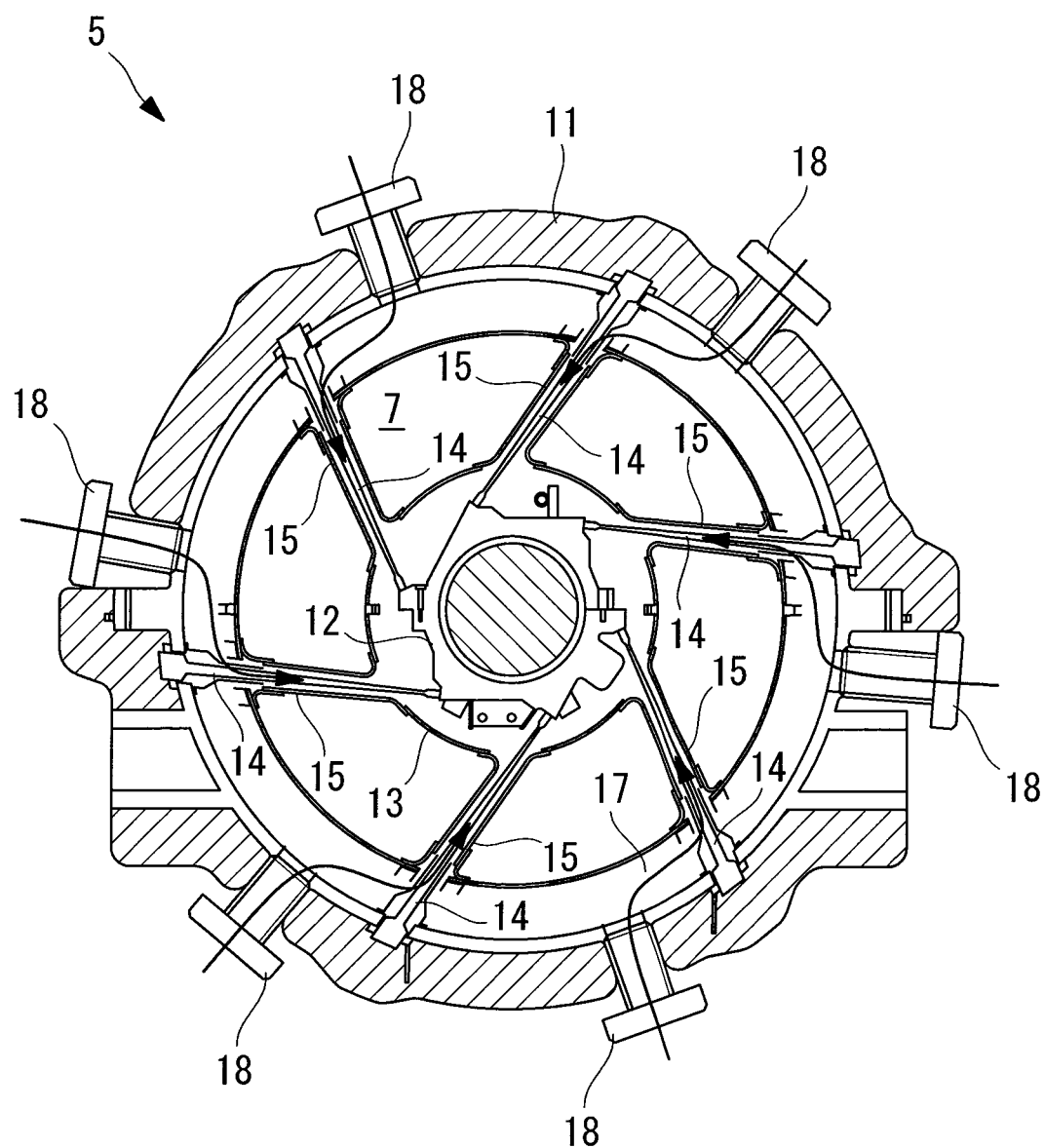
FIG. 3 is a cross-sectional view illustrating the configuration of the exhaust section shown in FIG. 2, taken along the line A-A.

FIG. 2 is a partially enlarged view illustrating a configuration of the exhaust section shown in FIG. 1. FIG. 3 is a cross-sectional view illustrating the configuration of the exhaust section shown in FIG. 2, taken along the line A-A.

The exhaust section 5 has a gas path part 7 formed therein, and the exhaust gas discharged from the turbine section 4 flows into the gas path part 7.

As shown in FIGS. 1 and 2, the exhaust section 5 comprises a casing 11 that forms the outer shape of the exhaust section 5, a bearing part 12 that rotatably supports the rotary shaft, an internal diffuser 13 that surrounds the bearing part 12, a strut 14 that supports the bearing part 12, a strut cover 15 that covers the periphery of the strut 14, and a hollow strut 16 that supports the internal diffuser 13.

The exhaust section 5 further has a cooling flow channel 17 through which air for cooling the strut 14 is introduced from outside the casing 11.

The casing 11 and the internal diffuser 13 define the gas path part 7 therebetween, providing a diffuser in which the cross sectional area of the gas path part 7 increases toward the downstream side (rightward in FIG. 2).

The strut 14 extends from a part of the inner surface of the casing 11 close to the turbine section 4 toward the rotary shaft. The cooling flow channel 17 is annularly arranged to accommodate the radially outer attachment of the strut 14 to the casing 11. The casing 11 has an opening 18 that connects the cooling flow channel 17 to the outside of the casing 11.

In this embodiment, six struts 14 support the bearing part 12, and openings 18 are formed between the six struts 14. However, the number of the struts 14 and the positions of the openings 18 are not limited to those described above with respect to this embodiment.

The strut cover 15 surrounding the strut 14 extends in the radial direction while leaving a space from the strut 14. The space between the strut 14 and the strut cover 15 is in communication with the cooling flow channel 17 formed along the inner surface of the casing 11 and thus forms a part of the cooling flow channel 17.

The bearing part 12 rotatably supports the rotary shaft and is supported by the struts 14 extending from the casing 11. A seal ring holding part 20 is disposed at the side of the bearing part 12 closer to the turbine section 4.

Figure 4:
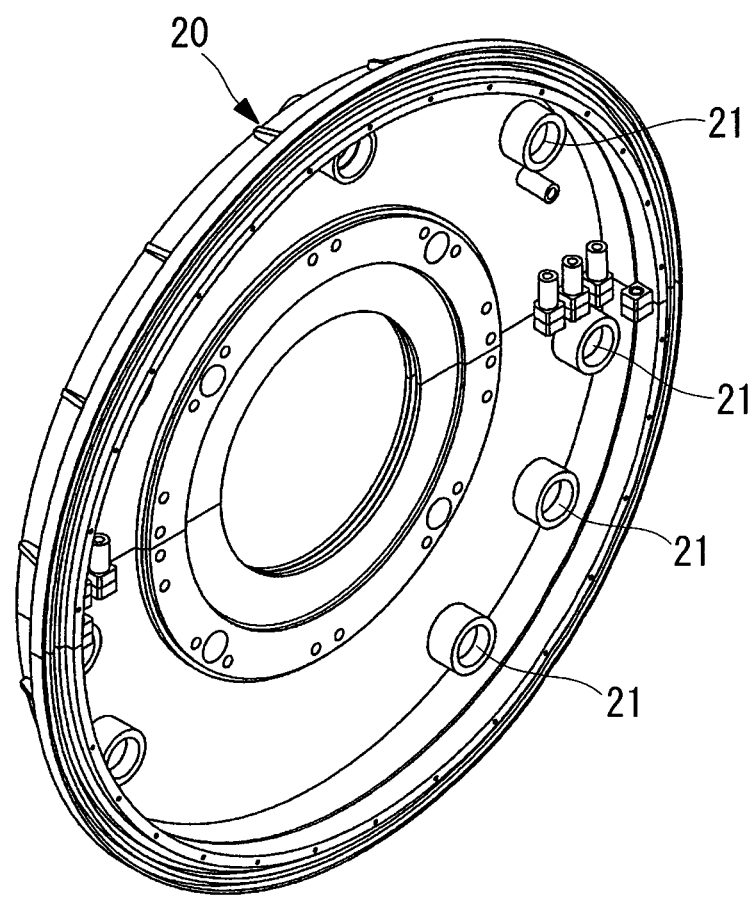
FIG. 4 is a perspective view illustrating a seal ring holding part shown in FIG. 2.

FIG. 4 is a perspective view illustrating a configuration of the seal ring holding part shown in FIG. 2.

As shown in FIGS. 2 and 4, the seal ring holding part 20 is a ring-shaped plate member.

The seal ring holding part 20 has a flow opening 21 that allows air to flow from inside of the internal diffuser 13 into the turbine section 4. The flow opening 21 forms a part of the cooling flow channel 17.

In this embodiment, the seal ring holding part 20 has eight flow openings 21. However, the number of the flow openings 21 is not limited to eight but can be any other number larger than or smaller than eight.

As shown in FIGS. 2 and 3, the cooling flow channel 17 is formed by the openings 18 of the casing 11, the inner surface of the casing 11, the spaces between the struts 14 and the strut covers 15, the space between the bearing part 12 and the internal diffuser 13 and the flow openings 21.

The cooling flow channel 17 has an opening between the turbine section 4 and the gas path part 7, or more specifically, at the radially inner wall downstream of the last-stage moving blade of the turbine section 4.

The hollow strut 16 extends radially inwardly from a part of the inner surface of the casing 11 downstream of the struts 14 (rightward in FIG. 2). The hollow strut 16 is a tubular member and is connected to the casing 11 at its radially outer end and to the internal diffuser 13 at its radially inner end. The space in the hollow strut 16 is in communication with the outside of the casing 11 and the internal space of the internal diffuser 13 and thus forms a cooling flow channel 25.

Figure 5:
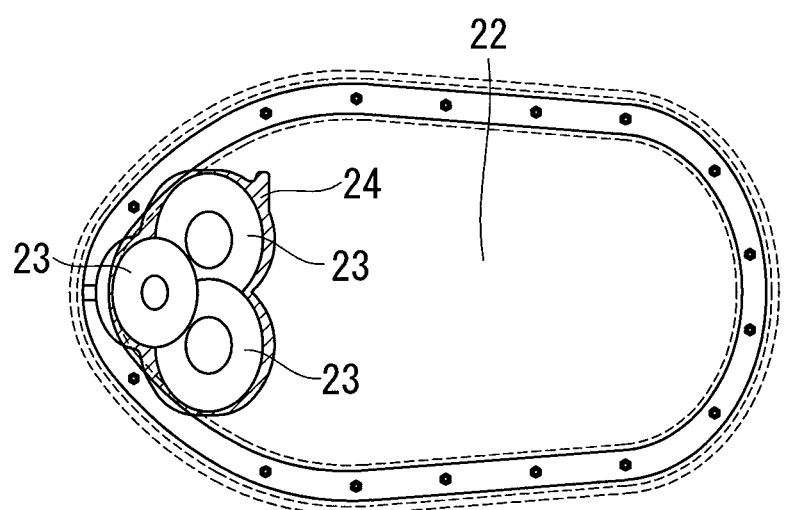
FIG. 5 is a diagram illustrating a configuration of a lid part shown in FIG. 2, viewed in the direction of the arrow B.

FIG. 5 is a diagram illustrating a configuration of a lid part shown in FIG. 2.

As shown in FIGS. 2 and 5, a lid part 22 is placed on the opening of the hollow strut 16 formed in the casing 11.

The lid part 22 is intended to limit the flow rate of the air flowing into the internal space of the internal diffuser 13 through the hollow strut 16.

The lid part 22 has a through-hole 24 in which a plurality of pipes 23 coupled to the bearing part 12 by the hollow strut 16 is inserted. The through-hole 24 is wider than the pipes 23, so that a clearance that allows air to pass through is formed between the through-hole 24 and the pipes 23.

Next, cooling of the exhaust section 5 of the gas turbine 1 configured as described above will be described.

When the gas turbine 1 starts operating, exhaust gas flows from the turbine section 4 into the gas path part 7 of the exhaust section 5 as shown in FIG. 2. In the radially inner region of the turbine section 4 downstream of the last-stage moving blade, the pressure is lower than the atmospheric pressure.

In other words, a pressure difference occurs between the opposite ends of the cooling flow channel 17 to produce an air flow from the outside of the casing 11 toward the gas path part 7 in the cooling flow channel 17.

The air flow in the cooling flow channel 17 enters into the internal diffuser 13 while drawing heat from the struts 14 when flowing between the struts 14 and the strut covers 15. The air having entered the internal diffuser 13 then passes through the flow openings 21. The air having passed through the flow openings 21 then flows into the gas path part 7 through an opening formed between the turbine section 4 and the gas path part 7.

Meanwhile, as shown in FIGS. 2 and 5, air also flows into the hollow strut 16 through the through-hole 24 of the lid part 22 placed to cover the opening of the hollow strut 16. The air has a lower temperature than the exhaust gas flowing through the gas path part 7. The air having flowed into the hollow strut 16 then flows into the cooling flow channel 25 to cool the periphery of the bearing and then flows into the air having passed through the spaces between the struts 14 and the strut covers 15 described above.

The amount of inflow of air through the clearance of the through-hole 24 of the lid part 22 is less than the amount of inflow of air through the opening 18. In other words, the area of the clearance of the through-hole 24 is smaller than the area of the opening 18.

In the configuration described above, the pressure difference between the outside of the casing 11 and the inside of the gas path part 7 produces air flow from the outside of the casing 11 to the periphery of the bearing through the openings 18 and the cooling flow channel 17. The air flowing in the cooling flow channel 17 cools the struts 14 when flowing along the struts 14. Therefore, the struts 14 can be cooled without decreasing the efficiency of the gas turbine 1, unlike the case where compressed air is extracted from the compressor section 2.

Since the cooling flow channels 17 and 25 open at positions downstream of the last-stage moving blade of the turbine section 4, the cooling flow channels 17 and 25 have an increased pressure difference between the opposite ends thereof. Therefore, more air can be supplied to the struts 14 and the periphery of the bearing through the cooling flow channel 17 and cool them more efficiently than in the case where the cooling flow channels 17 and 25 open at other positions.

Since the cooling flow channel 17 is formed to surround the struts 14, the area of the struts 14 in contact with the air flowing in the cooling flow channel 17 increases. Therefore, the efficiency of cooling of the struts 14 by the air flowing in the cooling flow channel 17 increases.

Furthermore, since the cooling flow channel 17 is formed between the struts 14 and the gas path part 7, less heat is transferred from the exhaust gas flowing in the gas path part 7 to the struts 14.

Since air at lower temperature than the exhaust gas flowing in the gas path part 7 is introduced into the cooling flow channel 25 through the hollow strut 16, the periphery of the bearing is cooled.

Furthermore, since the lid part 22 is provided, the flow rate of the air flowing into the cooling flow channel 25 through the hollow strut 16 can be adjusted, thereby preventing decrease of the flow rate of the air for cooling the struts 14.

The invention claimed is:

1. A structure of an exhaust section of a gas turbine, comprising:
    a casing defining a gas path part and an opening therein;
    a bearing part for rotatably supporting a rotor having moving blades of a turbine section;
    a strut extending inwardly from the casing and supporting the bearing part;
    a strut cover extending along the strut to define a space between the strut and the strut cover; and
    an internal diffuser extending along a rotational axis of the turbine section to form an air space surrounding the bearing part;
    wherein the space defined between the strut and the strut cover extends from the opening toward the bearing part along the strut, and
    wherein the air space surrounding the bearing part is in communication with the space defined between the strut and the strut cover to form a cooling flow channel together with the space defined between the strut and the strut cover, the cooling flow channel guiding air from the opening to the air space surrounding the bearing part via the space defined between the strut and the strut cover, and
    wherein the cooling flow channel has an another opening for guiding air from the opening to the gas path part and introducing the air into the gas path part at a position downstream of a last-stage moving blade of the turbine section.

2. The structure of an exhaust section of a gas turbine according to claim 1, further comprising:
    a hollow strut extending from the casing, supporting the internal diffuser and connecting the outside of the casing and the inside of the internal diffuser to each other; and
    a lid part for adjusting an opening area of the hollow strut on the casing.

3. A gas turbine, comprising:
    a compressor section for compressing air;
    a combustor for mixing the air compressed by the compressor section and fuel to cause combustion to generate combustion gas;
    a turbine section for deriving rotational driving force from the combustion gas; and
    the exhaust section according to claim 1 for receiving exhaust gas discharged from the turbine section flows.

* * * * *